United States Patent [19]

Harrison

[11] Patent Number: 4,775,036

[45] Date of Patent: Oct. 4, 1988

[54] FRICTION PAD ASSEMBLIES AND THEIR SUPPORT

[75] Inventor: Anthony W. Harrison, Selly Oak, England

[73] Assignee: Lucas Industries public limited company, Birmingham, England

[21] Appl. No.: 894,838

[22] Filed: Aug. 8, 1986

[30] Foreign Application Priority Data

Aug. 13, 1985 [GB] United Kingdom ............... 8520281

[51] Int. Cl.⁴ ........................................... F16D 65/02
[52] U.S. Cl. ............................. 188/250 B; 188/73.1; 188/73.38
[58] Field of Search ................... 188/73.1, 73.38, 234, 188/250 E, 250 B, 73.37

[56] References Cited

U.S. PATENT DOCUMENTS

| | | | |
|---|---|---|---|
| 202,772 | 4/1878 | Allen | 188/234 |
| 2,451,329 | 10/1948 | Gaenssle | 188/234 |
| 2,791,300 | 5/1957 | Bonkowski | 188/234 |
| 3,486,589 | 12/1969 | Hillegass | 188/250 B |
| 3,800,920 | 4/1974 | Warwick | 188/73.1 |
| 4,084,664 | 4/1978 | Haraikawa | 188/196 BA |
| 4,230,207 | 10/1980 | Stahl | 188/73.1 |
| 4,313,527 | 2/1982 | Pickel | 188/73.1 |
| 4,445,594 | 5/1984 | Hoffman, Jr. | 188/234 |
| 4,596,317 | 6/1986 | Nagai et al. | 188/73.38 |

FOREIGN PATENT DOCUMENTS

| 138081 | 4/1985 | European Pat. Off. | 188/73.1 |
|---|---|---|---|
| 2405397 | 6/1979 | France | 188/73.1 |

Primary Examiner—Randolph A. Reese
Assistant Examiner—Anthony Knight
Attorney, Agent, or Firm—Scrivener and Clarke

[57] ABSTRACT

The friction pad assembly of the present invention has a generally rectangular back plate with two retaining tabs projecting from opposite side edge regions, at an angle to the general plane of the back plate. The support or shoe is also generally rectangular and has a recess formed in each of two opposing side edges, the retaining tabs on the back plate engaging snugly into these recesses. The support has a further H-shaped recess in its front face within which an elongate spring plate is secured so as to project beyond opposing ends of said support. Thus, in use, the friction pad assembly can be quickly and simply mounted on the support and when the brake is operated the end region of the spring plate through which pad drag is passed to pad guides, flexes to thus allow for unhindered axial movement of the friction pad assembly and support.

10 Claims, 2 Drawing Sheets

FRICTION PAD ASSEMBLIES AND THEIR SUPPORT

DESCRIPTION

The present invention relates to a friction pad assembly for use in a disc brake and the support for such a friction pad assembly.

In particular the present invention relates to a friction pad assembly and support for use in a railway vehicle. Conveniently friction pad assemblies comprise a pad of friction material which is secured, usually by moulding, to a back plate. Friction pad assemblies as designed for railway vehicles, are usually mounted in shoes and retained therein by a pad retaining plate which is usually bolted to the shoe.

The aim of the present invention is to provide a friction pad assembly which, when engaged with its support, operates as required, but which can be simply and quickly disengaged and replaced as and when required.

According to the present invention there is provided a friction pad assembly comprising a pad of friction material secured to a generally planar backing plate, the backing plate having at least one retaining tab projecting from its edge and extending at an angle to the general plane of the backing plate.

In a preferred embodiment of a friction pad assembly constructed according to the present invention two such retaining tabs are provided on the backing plate. Preferably the backing plate and pad are symmetrical about two axes perpendicular to each other, the backing plate having two retaining tabs located on opposing edges. In this way, the friction pad assembly can be correctly inserted in a brake in either of two ways, it being impossible to locate the pad upside down.

According to a further aspect of the present invention there is provided a support for a friction pad assembly, said support comprising a substantially planar plate which has a first recess formed in each of two opposing side edge regions for engagement with part of a friction pad assembly, and an elongate recess extending transverse to a line extending between said first recesses, an elongate spring plate being secured in said elongate recess so as to project beyond opposing ends of said plate.

In a preferred embodiment of this further aspect of the present invention, the elongate recess is generally H-shaped with the spring plate being secured therein by the edges of the elongate recess being peened-over in the mid region of said elongate, H-shaped recess. This support can be used with the preferred embodiment of friction pad assembly referred to hereabove, the two retaining tabs of the friction pad assembly being engaged on in each of said first recesses in the support to provide accurate location both in the tangential and radial directions, with the backing plate engaging against the plate of the support and said elongate spring plate. In use, the ends of the spring plate engage guides in the brake and pad drag is conveyed via the retaining tabs to the support, one or other end of the spring plate being pressed against its respective guide. The frictional forces between the spring plate and the guide against which it is pressed, do not affect axial movement of the support and friction pad assembly during braking as the spring plate flexes to allow this travel; the elongate recess and spring plate being designed so that the spring plate can flex somewhat more than the normal caliper and pad elastic deflection.

The support is preferably mounted in a quasi-articulated manner on an elongate adjuster nut which is screw-threadedly mounted on an actuator member. This quasi-articulation is provided by an enlarged end of the adjuster nut being held against the undersurface of the support by a further spring plate which is bolted to the support. Thus, the adjuster nut may tilt with respect to the support, the further spring plate then flexing, the tilting facility enabling the friction pad to be always square with the braking surface and thus reducing the possibility of tapered wear either radially or tangentially.

To replace a friction pad assembly the adjuster nut can be rotated on the actuator member to thus wind the support and friction pad assembly back from the braking surface. When there is sufficient clearance between the friction pad assembly and the braking surface, the friction pad assembly can be moved forwards to release the retaining tabs from the recesses in the side edges of the support. A new friction pad assembly can then be substituted and the adjuster nut rotated to wind the friction pad assembly forwards to a secure, ready-for-use, position.

The present invention will now be further described, by way of example, with reference to the accompanying drawings, in which.

Figure 1:
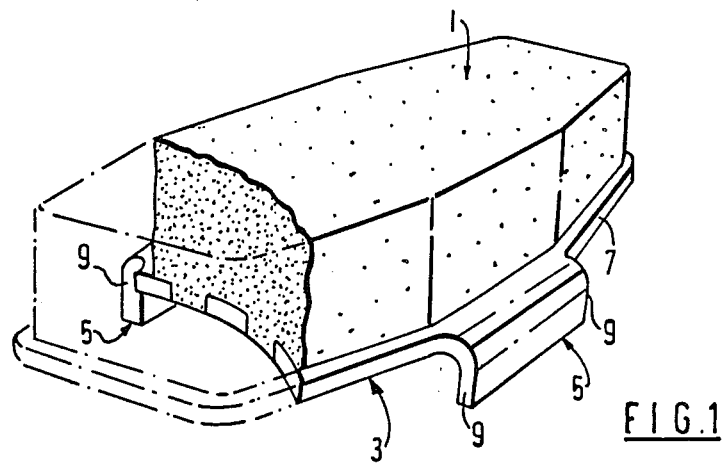
FIG. 1 is a perspective view of a preferred embodiment of friction pad assembly constructed according to the present invention.

The friction pad assembly illustrated in FIG. 1 of the accompanying drawings, comprises a pad of friction material 1 secured to a generally planar backing plate 3. The pad and backing plate are symmetrical about two perpendicular axes lying in the plane of the backing plate 3. A retaining tab 5 is provided on each side edge 7 and extends substantially perpendicular to the plane of the backing plate 3. Each retaining tab 5 has parallel side edges 9 which in use, convey pad drag to a support 11.

Figure 2:
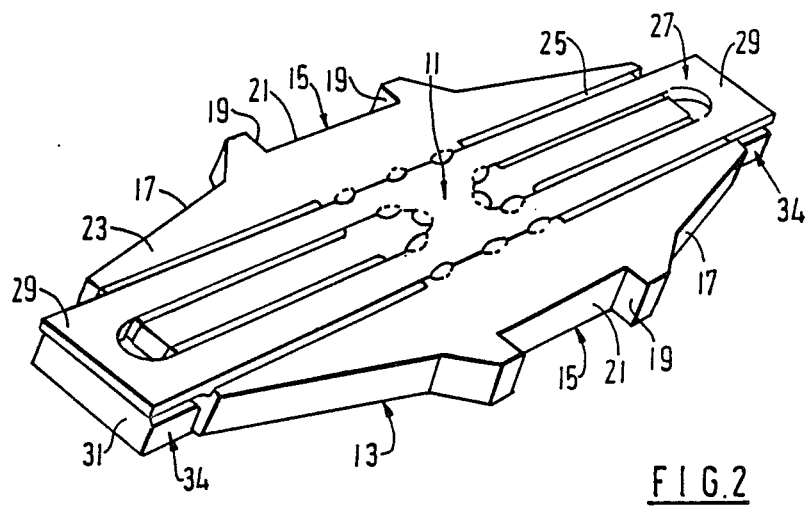
FIG. 2 is a perspective view of a preferred embodiment of support constructed according to a futher aspect of the present invention.
Figure 3:
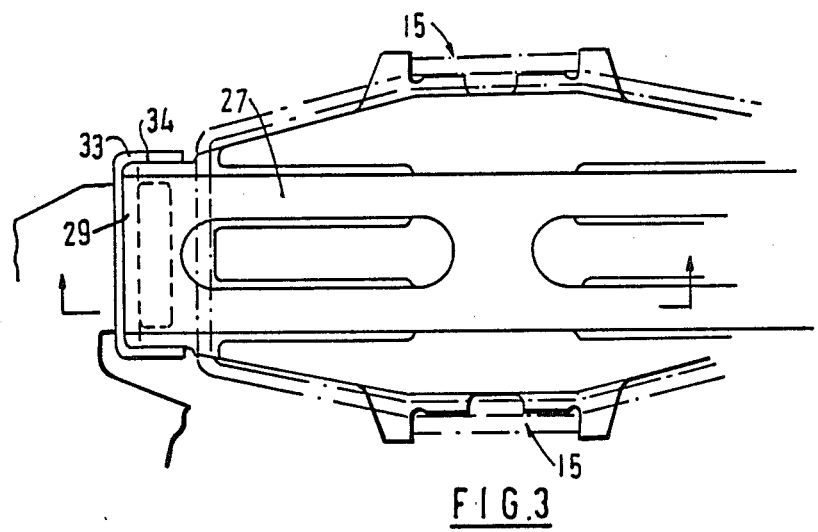
FIG. 3 is a plan view of the support of FIG. 2, located in a brake.
Figure 4:
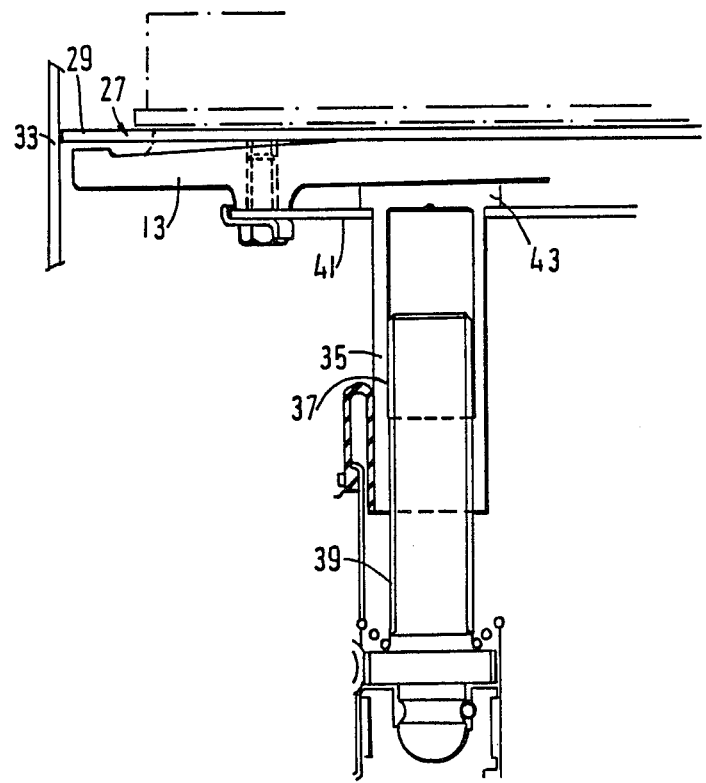
FIG. 4 is a side, cross-sectional view of the support of FIG. 3, taken along line I—I.

The support 11 illustrated in FIGS. 2, 3 and 4 comprises a generally planar plate 13 with recesses 15 formed one in each side edge 17. These recesses 15 each have parallel side edges 19 which mate with the side edges 9 of the retaining tabs 5 of the friction pad assembly, to tantentially accurately locate the friction pad assembly with respect to the support 11. Further, the tabs 5 also engage against the base 21 of each recess 15 to radially locate the friction pad assembly.

In the face 23 of the support plate 13, which engages the friction pad assembly, an elongate H-shaped recess 25 is formed. An elongate spring plate 27 is located in this recess 25, with the surface of the plate at the edges of the H-shaped recess 25, in its mid-region, being peened-over at 28 to secure the spring plate 27 to the support plate 13. The end regions 29 of the spring plate 27 extend beyond the ends 31 of the support plate 13 to engage guides 33 when located in a brake—see FIG. 3. The spring plate 27 thus locates the friction pad assembly and support tangentially, whilst side faces 34 of the ends 31 of the support plate 13, locate the friction pad assembly and support, radially.

In use, pad drag forces are conveyed by the retaining tabs 5 to the support plate 13, and one or other of the end regions 29 of the spring plate 27 is thus pressed against the respective guide 33. The frictional forces between the spring plate 27 and the guide 33 against which it is pressed, do not, however, affect the axial braking movement of the friction pad assembly and support, as the spring plate 27 flexes to allow such movement. To facilitate unhindered flexing, the H-shaped recess 25 is of sufficient depth, at least at its end regions, to allow the spring plate 27 to flex somewhat more than the normal caliper and pad elastic deflection.

As can be seen in FIG. 4 of the accompanying drawings, the support plate 13 is mounted on an adjuster nut 35 which is screw-threadedly secured as at 37, to an actuator member 39. The adjuster nut 35 is elongated and extends through a hole in a further spring plate 41, the further spring plate 41 being bolted to the support plate 13 with an enlarged end 43 of the adjuster nut 35 trapped between the spring plate 41 and the support plate 13. This produces a quasi-articulated construction whereby the support plate 13 can tilt to a limited extent with respect to the adjuster nut and actuator member 39. This reduces the possibility of tapered pad wear either radially or tangentially.

To replace the friction pad assembly 1,3 the adjuster nut 35 is rotated on the actuator member 39, to thus wind the support 11 and friction pad assembly 1,3 back on the screw thread 37, away from the braking surface. When there is sufficient clearance between the friction pad assembly 1,3 and the braking surface, the friction pad assembly 1,3 can be moved forwards to release the tabs 5 from the recesses 15 in the support. A new friction pad assembly can then be substituted and the support wound forwards to secure the new friction pad assembly in the ready-for-use position. By virtue of the symmetrical construction of the friction pad assembly 1,3, the pad cannot be located upside down.

The present invention thus provides a simple, easily replaceable friction pad assembly and support therefor.

I claim:

1. A friction pad assembly comprising a pad of friction material secured to a generally planar backing plate, the backing plate having at least two retaining tabs located on opposing edges each extending at an angle to the general plane of the backing plate, said backing plate and friction pad being symmetrical about two axes perpendicular to each other, in combination therewith a support comprising a substantially planar plate which has a first recess formed in each of two opposing side edge regions and an elongate recess formed in one face so as to extend transverse to an imaginary line extending between said first recesses, an elongate spring being secured in said elongate recess so as to project beyond opposing ends of said substantially planar plate, and the retaining tabs of the backing plate of the friction pad assembly engaging one in each of said first recesses.

2. A friction pad assembly according to claim 1, wherein the retaining tab extends substantially at right angles to each general plane of the backing plate, away from the friction pad.

3. A friction pad assembly according to claim 1, wherein each retaining tab has parallel side edges.

4. The combination according to claim 1, wherein a base and parallel side edges define each said first recess said parallel side edges mating with the side edges of said retaining tabs.

5. The combination according to claim 4, wherein the tabs engage against the base of each said first recess.

6. The combination according to claim 1, wherein a base and parallel side edges define each said first recess, and the tabs engage against the base of each said first recess.

7. The combination according to claim 1, wherein said elongate recess is H-shaped and said elongate spring is a substantially complementary shape, the edges of the H-shaped recess being peened-over in its mid region, to retain the spring in said H-shaped recess.

8. The combination according to claim 1, wherein the support plate is mounted on an adjuster nut which is screw threadedly secured to an actuator member.

9. The combination according to claim 8, wherein the adjuster nut extends through a hole in a spring plate, the spring plate being secured to the support plate, with an enlarged end region of the adjuster nut trapped between the spring plate and the support plate.

10. A support for a friction pad assembly, said support comprising a substantially planar plate which has a first recess formed in each of two opposing side edge regions for engagement with part of a friction pad assembly, and an elongate recess extending transverse to a line extending between said first recesses, an elongate spring plate being secured in said elongate recess so as to project beyond opposing ends of said plate.

* * * * *